(12) United States Patent
Yang et al.

(10) Patent No.: US 9,098,449 B2
(45) Date of Patent: Aug. 4, 2015

(54) FFT ACCELERATOR

(71) Applicant: ANALOG DEVICES, INC., Norwood, MA (US)

(72) Inventors: Ning Yang, Boston, MA (US); David Miller, Stoughton, MA (US); Boris Lerner, Sharon, MA (US); Guolin Pan, Westwood, MA (US); Steven L. Cox, Sharon, MA (US); Jiang Wu, Westwood, MA (US)

(73) Assignee: Analog Devices, Inc., Norwood, MA (US)

(*) Notice: Subject to any disclaimer, the term of this patent is extended or adjusted under 35 U.S.C. 154(b) by 328 days.

(21) Appl. No.: 13/837,055

(22) Filed: Mar. 15, 2013

(65) Prior Publication Data

US 2014/0280421 A1    Sep. 18, 2014

(51) Int. Cl.
*G06F 17/14* (2006.01)
(52) U.S. Cl.
CPC .................................. *G06F 17/142* (2013.01)
(58) Field of Classification Search
CPC ...... G06F 17/14; G06F 17/141; G06F 17/142
See application file for complete search history.

(56) References Cited

U.S. PATENT DOCUMENTS

| | | | |
|---|---|---|---|
| 3,754,128 A * | 8/1973 | Corinthios | 708/400 |
| 4,117,541 A * | 9/1978 | Ali | 708/320 |
| 4,138,730 A | 2/1979 | Zaheer | |
| 4,689,762 A | 8/1987 | Thibodeau, Jr. | |
| 4,807,183 A | 2/1989 | Kung et al. | |
| 4,912,668 A * | 3/1990 | Aubie et al. | 708/402 |
| 4,996,661 A | 2/1991 | Cox et al. | |
| 5,034,910 A * | 7/1991 | Whelchel et al. | 708/407 |
| 6,003,056 A | 12/1999 | Auslander et al. | |
| 7,761,495 B2 | 7/2010 | Jaber | |
| 8,423,752 B2 | 4/2013 | Symes et al. | |
| 8,819,097 B2 | 8/2014 | Kwong et al. | |
| 8,825,729 B1 | 9/2014 | Cope et al. | |
| 2006/0224652 A1 | 10/2006 | Rounioja et al. | |
| 2009/0187746 A1 | 7/2009 | Symes et al. | |
| 2013/0066932 A1 | 3/2013 | Kwong et al. | |

FOREIGN PATENT DOCUMENTS

| | | |
|---|---|---|
| EP | 2009555 | 12/2008 |
| WO | 2005/057423 | 6/2005 |
| WO | 2006/099228 | 9/2006 |

OTHER PUBLICATIONS

Extended European Search Report for EP Application Serial No. 14158354.2 mailed Jan. 6, 2015, 9 pages.

(Continued)

*Primary Examiner* — Chuong D Ngo

(74) *Attorney, Agent, or Firm* — Patent Capital Group

(57) ABSTRACT

An FFT operation is performed by dividing n time-domain input points into a plurality of groups of m points, performing a plurality of constant-geometry butterfly operations on each of the groups of m points, and finally performing at least one in-place butterfly operation on the group of n points.

24 Claims, 13 Drawing Sheets

(56) References Cited

OTHER PUBLICATIONS

Jose Antonio Hidalgo et al., "Area-Efficient Architecture for Fast Fourier Transform", IEEE Transactions on Circuits and Systems II: Analog and Digital Signal Processing, Institute of Electrical and Electronics Engineers Inc., New York, NY, USA, Feb. 1, 1999, XP011012982, ISSN: 1057-7130, pp. 187-193.

Naga K. Govindaraju et al., "High Performance Discrete Fourier Transforms on Graphic Processors", High Performance Computing, Networking, Storage and Analysis, 2008. SC 2008. International Conference for IEEE, Piscataway, NJ, USA, Nov. 15, 2008, pp. 1-12.

* cited by examiner

FIG. 10

| Stage | Cycles for B Register Fills | | | | Cycles for Butterfly Operation | Cycles for D Register Fills | | Cycles for Main Memory Writes | |
|---|---|---|---|---|---|---|---|---|---|
| | Fill B0 | Fill B1 | Fill B2 | Fill B3 | | Fill D2 | Fill D3 | From D2 | From D3 |
| 1 | 0→6:2 | | | | | | | | |
| | | 8→14:2 | | | 7→17 | 11→18 | | 19→25:2 | |
| | 16→22:2 | | | | 15→25 | | 19→26 | | 27→33:2 |
| | | 24→30:2 | | | 23→33 | 27→34 | | 35→41:2 | |
| | 32→38:2 | | | | 31→41 | | 35→42 | | 43→49:2 |
| 2 | | 40→46:2 | | | 39→49 | 43→50 | | 51→57:2 | |
| | 48→54:2 | | | | 47→57 | | 51→58 | | 59→65:2 |
| | | 56→62:2 | | | 55→65 | 59→66 | | 67→73:2 | |
| | 64→70:2 | | | | 63→73 | | 67→74 | | 75→81:2 |
| 3 | | 72→78:2 | | | 71→81 | 75→82 | | 83→89:2 | |
| | 80→86:2 | | | | 79→89 | | 83→90 | | 91→97:2 |
| | | 88→94:2 | | | 87→97 | 91→98 | | 99→105:2 | |
| | | | 96→102:2 | | 95→105 | | 99→106 | | 107→113:2 |
| 4 | | | | 104→110:2 | 103→113 | 107→114 | | 115→121:2 | |
| | | | 112→118:2 | | 111→121 | | 115→122 | | 123→129:2 |
| | | | | 120→126:2 | 119→129 | 123→130 | | 131→137:2 | |
| | | | | | 127→137 | | 131→138 | | 139→145:2 |

FFT ACCELERATOR

TECHNICAL FIELD

Embodiments of the invention generally relate to digital-signal processing and, in particular, to fast Fourier transform ("FFT") accelerators.

BACKGROUND

The behavior of electromagnetic signals can be analyzed in the time domain (e.g., how the signal amplitude varies over time) as well as the frequency domain (i.e., the different frequency components that make up the signal). The Fourier transform mathematically relates these two domains and, because of its ubiquity across signal-processing applications, efforts have been made to accelerate its execution computationally—hence the many FFT approaches. In addition, a signal can be analyzed as a continuous waveform or, in digital signal processing (DSP) applications, as a large set of time-domain points. For DSP applications, an FFT "butterfly" algorithm may used to compute a discrete Fourier transform ("DFT") of a signal represented in digital form. The algorithm divides the points into subsets (in a process known as "decimation"), computes the DFT of each subset, and then processes the results of the DFT of each subset to produce a final result consisting of a set of frequency-domain points. The subsets may be so small that they each contain only a few (or even just one) time-domain points, making the DFT of each subset trivial—the DFT of a single point is simply the point itself. For example, an initial set of 1024 time-domain points may be decimated into 1024 subsets of one point each; the subsets are then carefully processed, combined and merged into a 1024-point frequency-domain result.

Most of the computational effort of the algorithm lies in the processing of the subsets. The processing occurs in a series of stages in which the subsets are first processed into intermediate results, the intermediate results are further processed, and so on, until the final set of frequency-domain points is produced. Each stage includes a plurality of parallel operations that each process n input points simultaneously to produce n output points—the value n is known as the "radix" of the FFT algorithm. Because a dataflow diagram of a radix-2 (i.e., a radix with a value of two) operation resembles a butterfly (as shown in FIG. 1A, in which points $x_0$, $x_1$ are processed into points $y_0$, $y_1$ in accordance with the equations $y_0=x_0+x_1$ and $y_1=x_0-x_1$), these operations are known as butterfly operations or butterflies. Operations having other radices are also known as butterfly operations (such as the radix-4 operation shown in FIG. 1B).

Many different variations of the above-described basic algorithm exist. For example, a decimate-in-time FFT separates the original time-domain points (and further sub-divisions) into odd and even groups, while a decimate-in-frequency FFT separates the original time-domain points (and further subdivisions) into first and second halves. An in-place FFT performs the transformation using only the memory space required to hold the original samples (at the expense of more complicated routing and control logic), while a constant-geometry FFT (also known as a constant-topology FFT) requires only simple routing and control logic (at the expense of requiring additional memory space).

For example, an in-place implementation that can perform an FFT on a 1024-point time-domain input requires a memory only large enough to hold the 1024 points but requires the points to be read in different patterns for each stage of the re-combination of the points. Assuming that the in-place implementation is radix-4 and decimate-in-time (though a similar analysis applies to any in-place implementation), five stages are required to re-combine the 1024 points (because $\log_4(1024)=5$). In the first stage, the first of 256 radix-4 butterflies receives points 0, 1, 2, 3; the second radix-4 butterfly receives points 4, 5, 6, 7; and so on. The results of each butterfly operation are written back to the same memory space that held the original 1024 points. In the second stage, the first butterfly receives points 0, 4, 8, 12 and the second butterfly receives points 1, 5, 9, 13; in the third stage, the first butterfly receives points 0, 16, 32, 48 and the second butterfly receives points 1, 17, 33, 49. In general, the input for the first radix-4 butterfly for stage three and beyond is given as $$\{0\},\{4^{(i-1)}\},\{2\times 4^{(i-1)}\},\{3\times 4^{(i-1)}\} \quad (1)$$

and, for the second butterfly, is $$\{0+1\},\{4^{(i-1)}+1\},\{2\times 4^{(i-1)}+1\},\{3\times 4^{(i-1)}+1\} \quad (2)$$

and so on, wherein i is the stage number.

Two different approaches may be used to implement the different reading patterns required for the in-place FFT, each having its own drawbacks. In a first approach, four different memory banks may be used, each capable of storing 1024 points, so that four points may be read from the four memory banks every cycle, in accordance with Equation (1). Obviously, this design quadruples the amount of memory required. Another conventional approach uses a single data bank but requires complicated hardware (e.g., logic and buffers) to support the different reading patterns. A constant-geometry approach similarly requires additional memory. A need therefore exists for fast, efficient FFT techniques and processors that require only a simple routing scheme and that do not use additional memory space.

SUMMARY

In general, various embodiments of the systems and methods described herein use both constant-geometry and in-place butterflies to compute an FFT of a set of input time-domain points. In one embodiment, a plurality of constant-geometry butterflies are performed on subsets of the input points; each constant-geometry butterfly includes a transposition of the data. When the plurality of constant-geometry butterflies have completed, the input points return to their original or "natural" order. One or more in-place operations may then be performed as necessary to combine the groups of points. For example, a 1024-point decimate-in-time FFT may use five stages of radix-4 butterfly operations. The first three stages may be computed using constant-geometry operations on sixteen 64-point subsets of the 1024 points; the last two stages may be computed using an in-place FFT method.

In one aspect, a method for computationally performing a Fast Fourier Transform ("FFT") on n points includes dividing the n points into a plurality of groups of m points, where m<n and performing a plurality of constant-geometry FFTs on each of the groups of m points. Each constant-geometry FFT includes (i) reading the m points from a computer memory into an input buffer; (ii) computationally applying a butterfly operation to each of the m points; (iii) writing results of the butterfly operation into an output buffer; and (iv) storing transposed contents of the output buffer to the original location of the m points in the computer memory, thereby overwriting the original m points. At least one in-place FFT is performed on the results of the plurality of constant-geometry FFTs stored in the computer memory, thereby completing the FFT of the n points.

N may be $2^x$, wherein x is an integer; m may be 64. The butterfly operation may be radix-2 or radix-4. The computer memory may be single-ported; only one read or write thereto may occur in a cycle. Performing the in-place FFT may include writing the m points to a different kind of input buffer. Writing the m points to the different kind of input buffer may cancel out the transposition of contents by the output buffer. N may not be a multiple of m; points may be added to the n points until the total number of points is a multiple of m.

In another aspect, a system for performing a Fast Fourier Transform ("FFT") on n points includes an input buffer for receiving a subset (of m points) of the n points, a butterfly unit for performing a butterfly operation on the m points; an output buffer (including an output port for transposing data points stored therein) for receiving a result of the butterfly operation, and control logic for directing the butterfly unit to perform a plurality of constant-geometry butterfly operations followed by at least one in-place butterfly operation.

A local memory (e.g., a single-ported memory and/or a memory of two banks) may store the n points. An input FIFO may receive the n points from an external memory, and an output FIFO may send the n points to an external memory. The input buffer may include a first type of input buffer for constant-geometry butterflies and a second type of input buffer for in-place butterflies.

In another aspect, a method for computationally performing a Fast Fourier Transform ("FFT") on n points includes performing a number of stages of in-place FFTs on all n points and dividing the n points into a plurality of groups of m points, where m<n. Then performing at least one stage of constant-geometry FFT, thereby completing the FFT of the n points. Each constant-geometry FFT includes (i) reading the m points from a computer memory into an input buffer; (ii) computationally applying a butterfly operation to the transposed contents of the input buffer; (iii) writing results of the butterfly operation into an output buffer; and (iv) storing the contents of the output buffer to the original location of the m points in the computer memory, thereby overwriting the original m points. N may be $2^x$, wherein x is an integer, and m may be 64. The butterfly operation may be radix-2 or radix-4. The computer memory may be single-ported; only one read or write thereto may occur in a cycle.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIGS. 9 and 10 illustrate a third stage of an FFT operation and the contents of a memory thereafter in accordance with the embodiment of the invention shown in FIG. 4A;

FIG. 12 illustrates an exemplary timing diagram for performing an FFT operation in accordance with the embodiment of the invention shown in FIG. 4A.

DETAILED DESCRIPTION

In various embodiments of the present invention, an input set of time-domain points (e.g., 512, 1024, or any other number of points) is divided into a plurality of smaller groups of points (e.g., 16, 64, or 256 points). A series of constant-geometry FFT butterfly operations is performed on each of the divided groups; each group may be computed separately and/or in parallel because the computation of each group may not depend on the results of another. The points of each group are transposed in each constant-geometry operation and, after a certain number of said operations (e.g., three), the points return to their natural order. One or more in-place butterfly operations may then be performed to combine the separate groups of partially computed results.

Figure 1A:
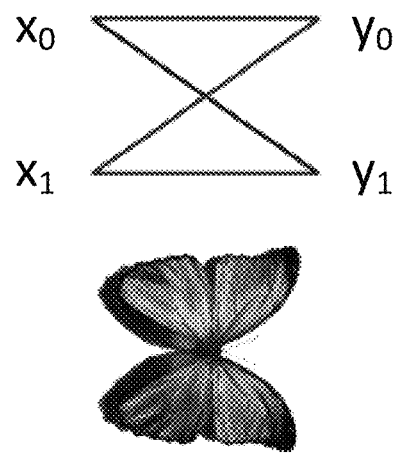
FIGS. 1A and 1B illustrate exemplary butterfly operations.
Figure 1B:
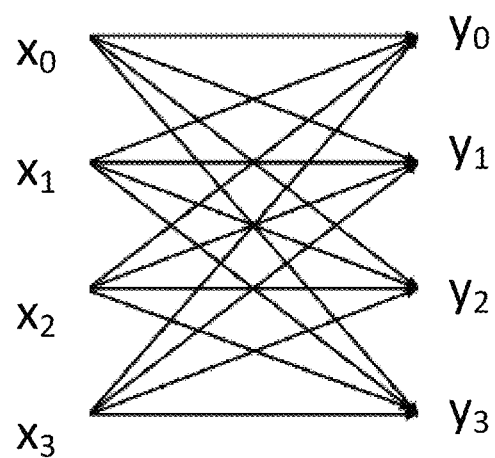
Figure 2A:
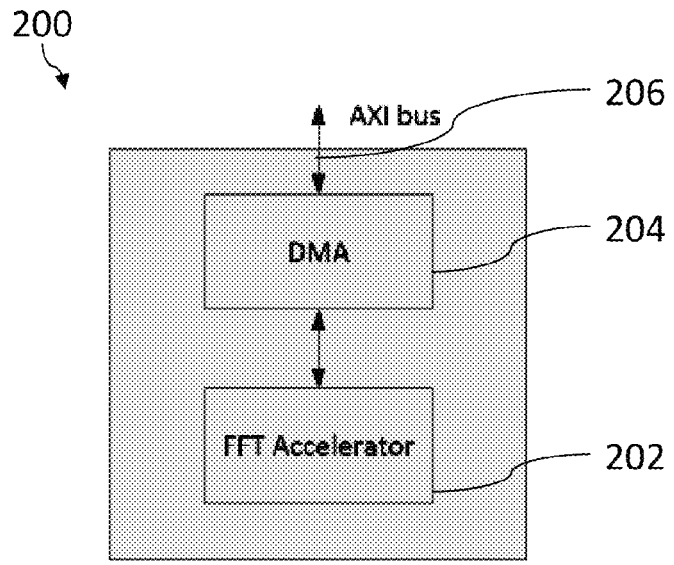
FIGS. 2A and 2B illustrate FFT accelerators in accordance with embodiments of the invention.

A top-level view 200 of an FFT accelerator 202 in accordance with the present invention is shown in FIG. 2A. In this embodiment, the FFT accelerator 202 communicates with other system components (e.g., a main memory, a general-purpose processor, and/or a digital-signal processor) using a direct-memory access ("DMA") unit 204 and a bus 206 (which may be an AXI bus). One of skill in the art will understand, however, that the FFT accelerator 202 may communicate with other system components using any bus architecture and/or memory-access protocol.

Figure 2B:
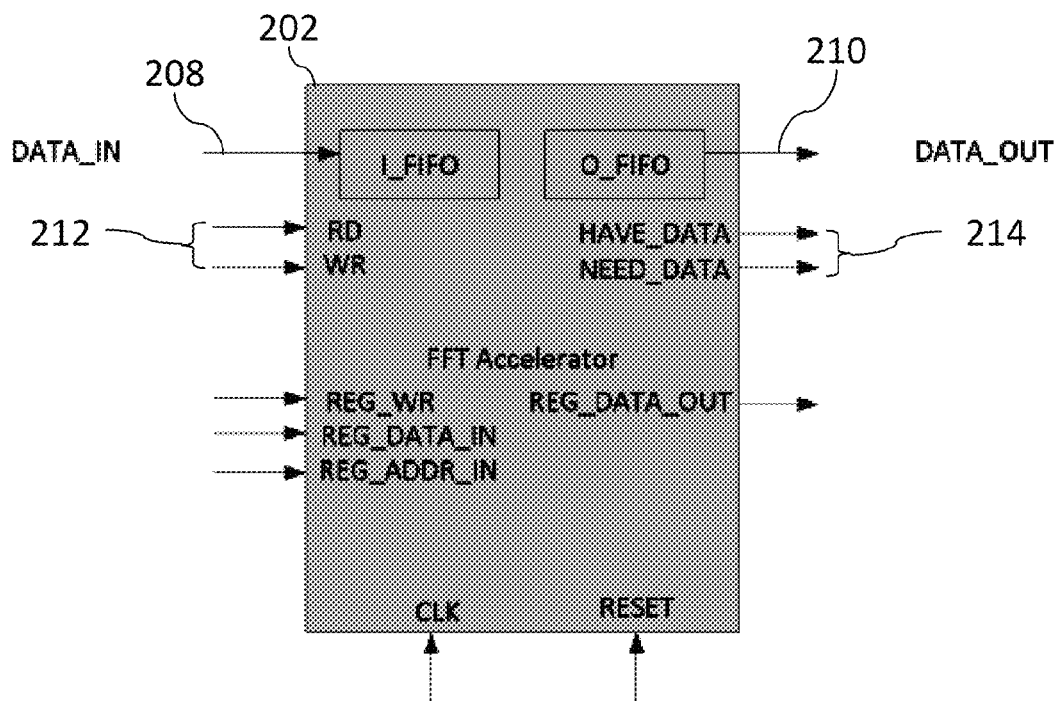

The FFT accelerator 202 is shown in greater detail in FIG. 2B, in which incoming data (from, e.g., a main memory) is received in a data input 208. The FFT accelerator 202 performs an FFT on the data, in accordance with embodiments of the present invention and explained in greater detail below, and outputs the processed data on an output port 210. The incoming and outgoing data may be stored in first-in, first-out ("FIFO") buffers in accordance with incoming read and write signals 212 and outgoing data-ready and data-request signals 214. The FFT accelerator 202 may receive or transmit other signals, such as a clock, reset, or register read/write signals; the current invention is not, however, limited to any particular set of input, output, or control signals, and one of skill in the art will understand that the FFT accelerator 202 may be implemented with more or fewer inputs or outputs.

Figure 3:
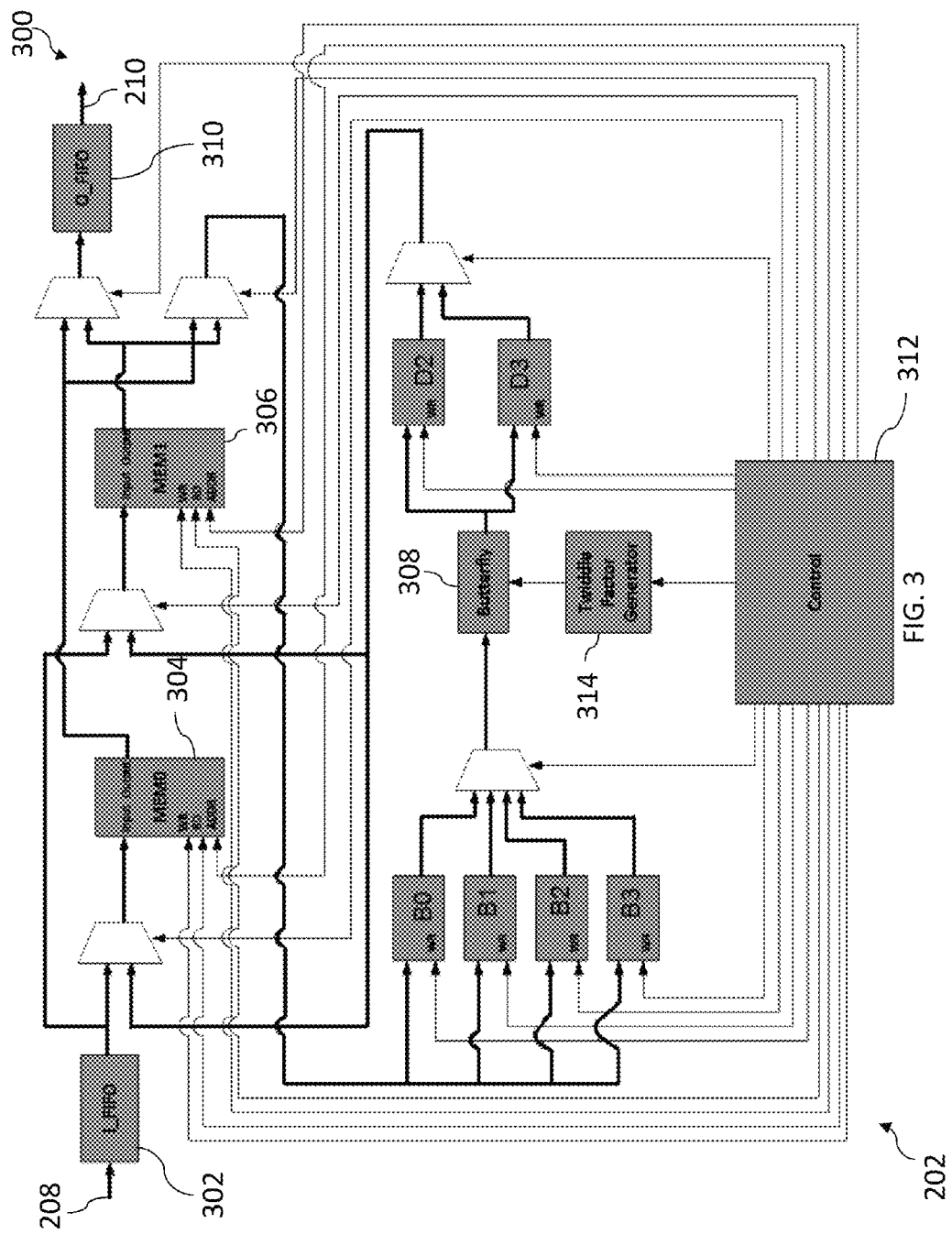
FIG. 3 schematically illustrates one implementation of an FFT accelerator in accordance with an embodiment of the invention.

A block diagram of one implementation 300 of the FFT accelerator 202 is shown in FIG. 3. In this embodiment, incoming data 208 is received in an input FIFO 302 and stored in local memories 304, 306. Subsets of the data are read out of the local memories 304, 306 into one or more input butterfly registers B0-B3; a butterfly unit 308 performs a conventional butterfly operation on the data stored in the input butterfly registers B0-B3. The butterfly unit 308, as one of skill in the art will understand, may be a digital-logic computation unit designed to carry out one or more types of butterfly operations. Results of the butterfly operations are stored in one or more output butterfly registers D2-D3 and then written back into the local memories 304, 306. The data may make several trips through the butterfly unit 308, as explained in greater detail below. Once the FFT is complete, the data is written to an output FIFO 310 in preparation for shipping out through the output port 210. As one of skill in the art will understand, a control module 312 may be used to generate the various control signals (e.g., read, write, address, and multiplex (mux) control) used in the FFT accelerator 202, but any type of control logic and/or modules are within the scope of the current invention. In one embodiment, a twiddle factor generator 314 is used to supply control signals to the butterfly unit 308.

The present invention is not limited to the particular implementation shown in FIG. 3, however, and other configurations of the system 300 are within the scope of the present invention. For example, the butterfly registers B0-B3 are on the output of the butterfly unit 308, and the butterfly registers D2-D3 are on the input of the butterfly unit 308. Either the B or the D butterfly registers may transpose the data on its path through the butterfly unit 308. In one embodiment, the butterfly registers that perform the transposition are sets of ping-pong registers; one of the pair of ping-pong registers is used to receive data, while the other of the pair of ping-pong registers (being already filled with data) is used to feed data to the butterfly unit 308. When the first of the pair of ping-pong registers is filled and the second of the pair of ping-pong registers has fed all of its data to the butterfly unit 308, their roles are reversed and the first of the pair is used to feed the butterfly unit 308 and the second receives new data. In one embodiment, there are four input registers and four output registers; each register may be configured to be either a B or a D register and/or transpose data in accordance with one or more control signals, as an application requires. In other embodiments, there are fewer than four input and/or output registers; the present invention is not limited to any particular number or type of input or output register.

Figure 4A:
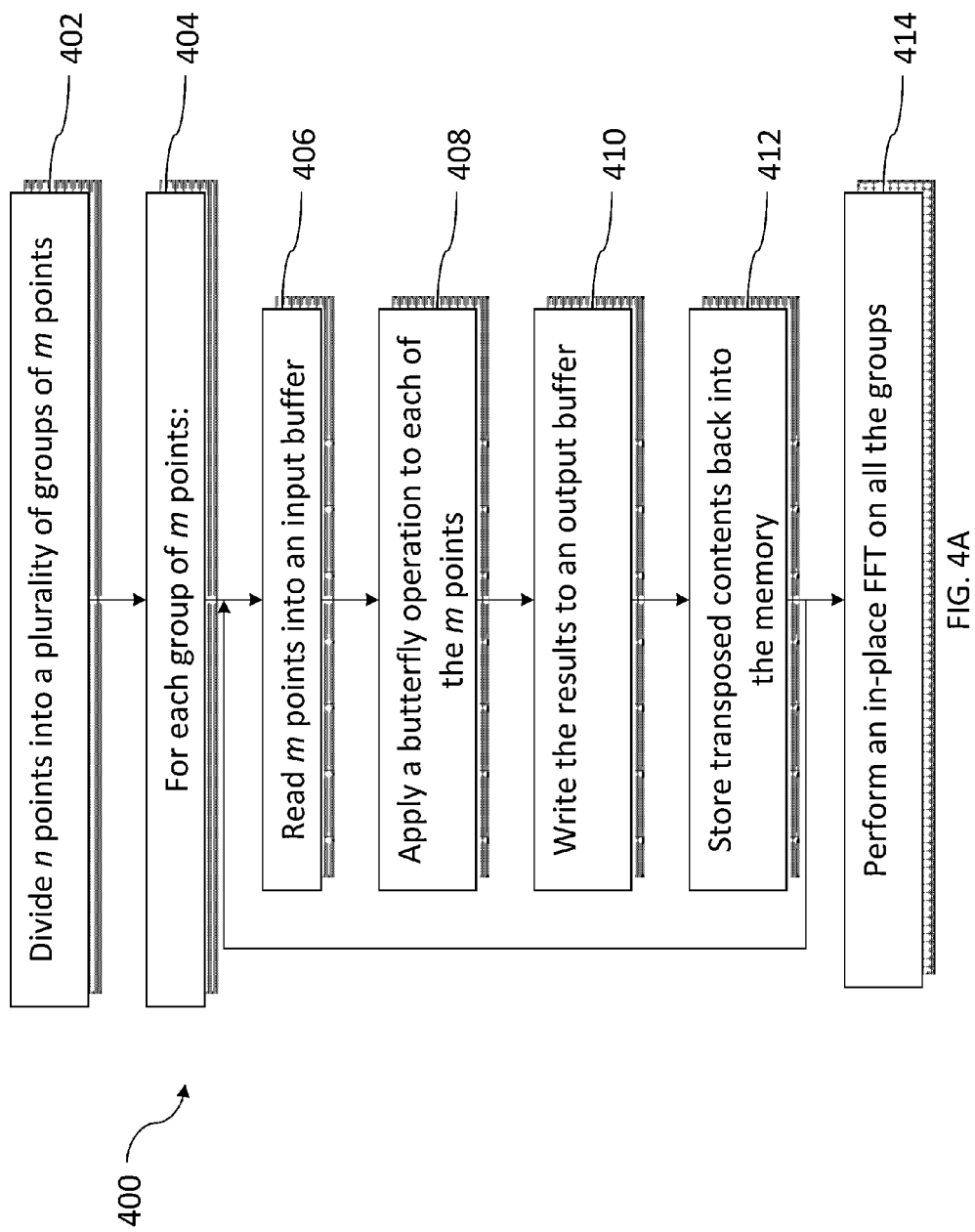
FIGS. 4A and 4B illustrate methods for computing an FFT in accordance with embodiments of the invention.
Figure 4B:
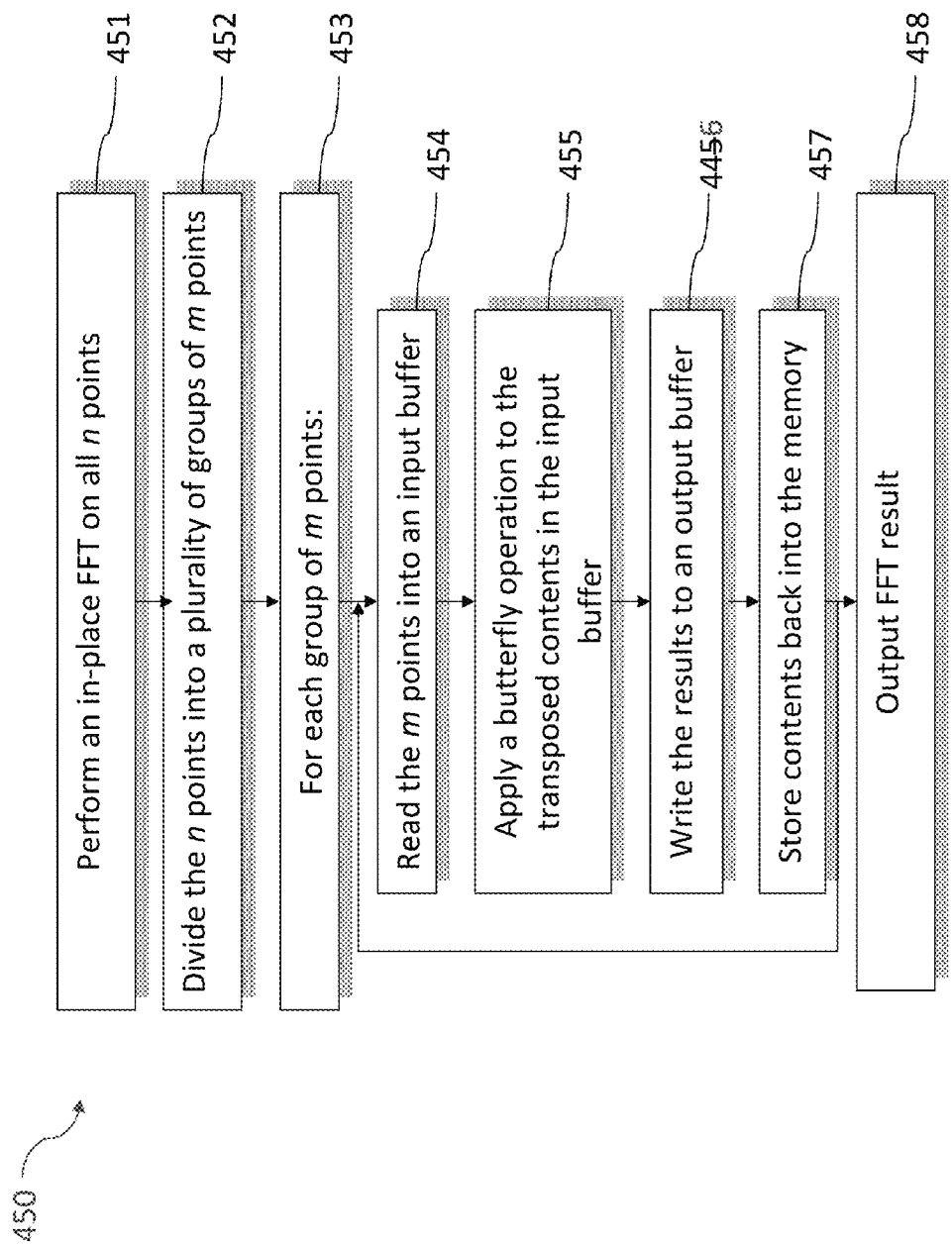

A method 400 for performing an FFT in accordance with an embodiment of the present invention is illustrated in FIG. 4A. In a first step 402, an input set of n time-domain points is divided into a plurality of groups of m points. In a second step 404, each group may be processed independently (e.g., all or some of the processing done in parallel). For each group, in a third step 406, the m points are read into an input buffer (from, e.g., a system or local memory). In a fourth step 408, a butterfly operation (e.g., a butterfly operation that operates on the same bit positions in each iteration) is applied to each of the m points. In a fifth step 410, the results are written to an output buffer and, in a sixth step 412, the results are transposed as they are written back into the memory. The third through sixth steps 406-412 may be repeated until the m points return to their natural order in the memory. The third through sixth steps 406-412 effectively complete constant-geometry FFT operations on each of the m points; the phrases "constant-geometry FFT operations" and/or "constant-geometry FFT" may refer to steps 406-412 for this particular embodiment of the invention. In a seventh step 414, one or more in-place FFTs are performed on the n points (i.e., all the groups) as necessary to complete the FFT operation. FIG. 4B illustrates a related method 450 in which, in the first step 451, a number of stages of in-place butterfly is applied to all n points. At step 452, the n points are divided into plurality of m points. For each group, at step 454, the m points are read into the input buffer. At step 455, a butterfly operation is applied to the transposed contents in the input buffer. At step 456, the butterfly result is written to the output buffer. At step 457, the contents of the output buffer are stored back to memory. The steps 454 through 457 effectively complete the constant-geometry FFT operations on each of the m points. After the constant-geometry FFT operations steps 454 through 457 have been repeated for all groups, each having m points, the entire FFT computation is completed and the data stored in the memory corresponds to the FFT result.

Returning to step 402, in greater detail, the n points may be stored in a system memory (and accessible via, for example, a system bus 206) and loaded into a local memory (e.g., the local memories 304, 306). In other embodiments, the system memory or local memory 304, 306 may be used exclusively; the present invention is not limited to any particular memory configuration. The n points may be loaded in one block or in different blocks, spread out in time. The input FIFO 302 may be used to compensate for any differences in the speed of the system and local memories. The number of groups, and size m of each group, may be based on the radix of the butterfly operation 308. In one embodiment, the butterfly unit 308 employs a radix-4 butterfly operation and m is 64, but other radix sizes and values of m are within the scope of the present invention. If the total number of data points n is not an integer multiple of m, additional, random values may be added to the actual data points to create a number of points that is a multiple of m.

Figure 5:
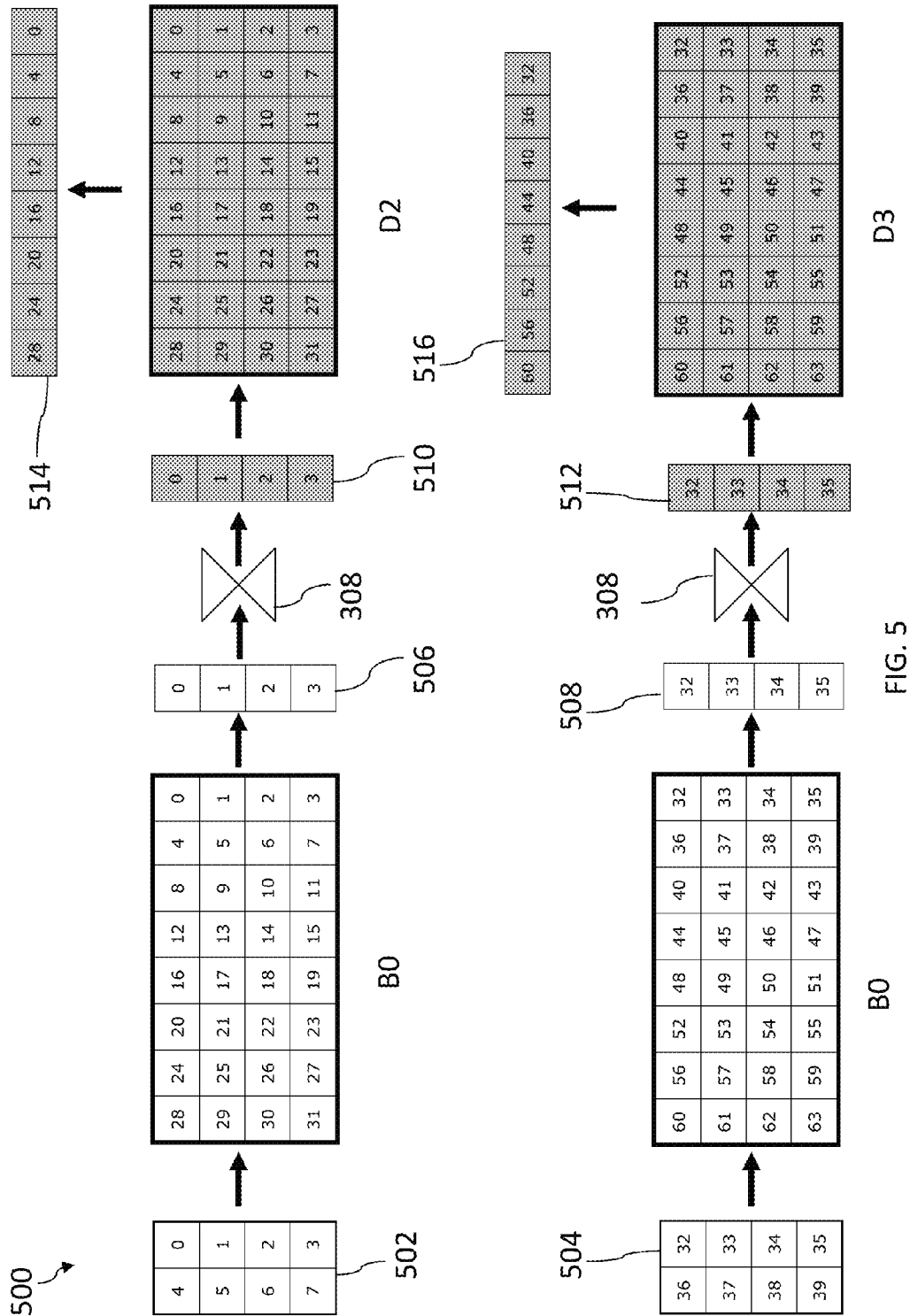
FIGS. 5 and 6 illustrate a first stage of an FFT operation and the contents of a memory thereafter in accordance with the embodiment of the invention shown in FIG. 4A.

Example embodiments of the third through sixth steps 406-412 are illustrated in FIGS. 5-10 (for the case in which m is 64, there are a total of 3 (i.e., log 4(64)) stages of constant-geometry FFT operations). FIG. 5 illustrates the first stage constant-geometry FFT, performing butterfly operation 500 on 64 input data points. The input butterfly register B0 is loaded with input data having indexes 0 . . . 31 (i.e., data in its original, "natural" order). The data corresponding to each index represents a point, and may have any value and occupy any number of bits; the present invention is not limited to any particular data format. The numbers herein refer to the data index, not to the actual data points (which change value during each butterfly operation).

The first 32 points of data are loaded in eight-bit groups 502 and the register B0 is loaded in-order from right to left. The input butterfly register B0 is re-loaded with input data having indexes 32 . . . 63 in eight-point groups 504. Values stored in the register B0 are output in four-point groups 506, 508 and applied to the butterfly unit 308.

Figure 6:
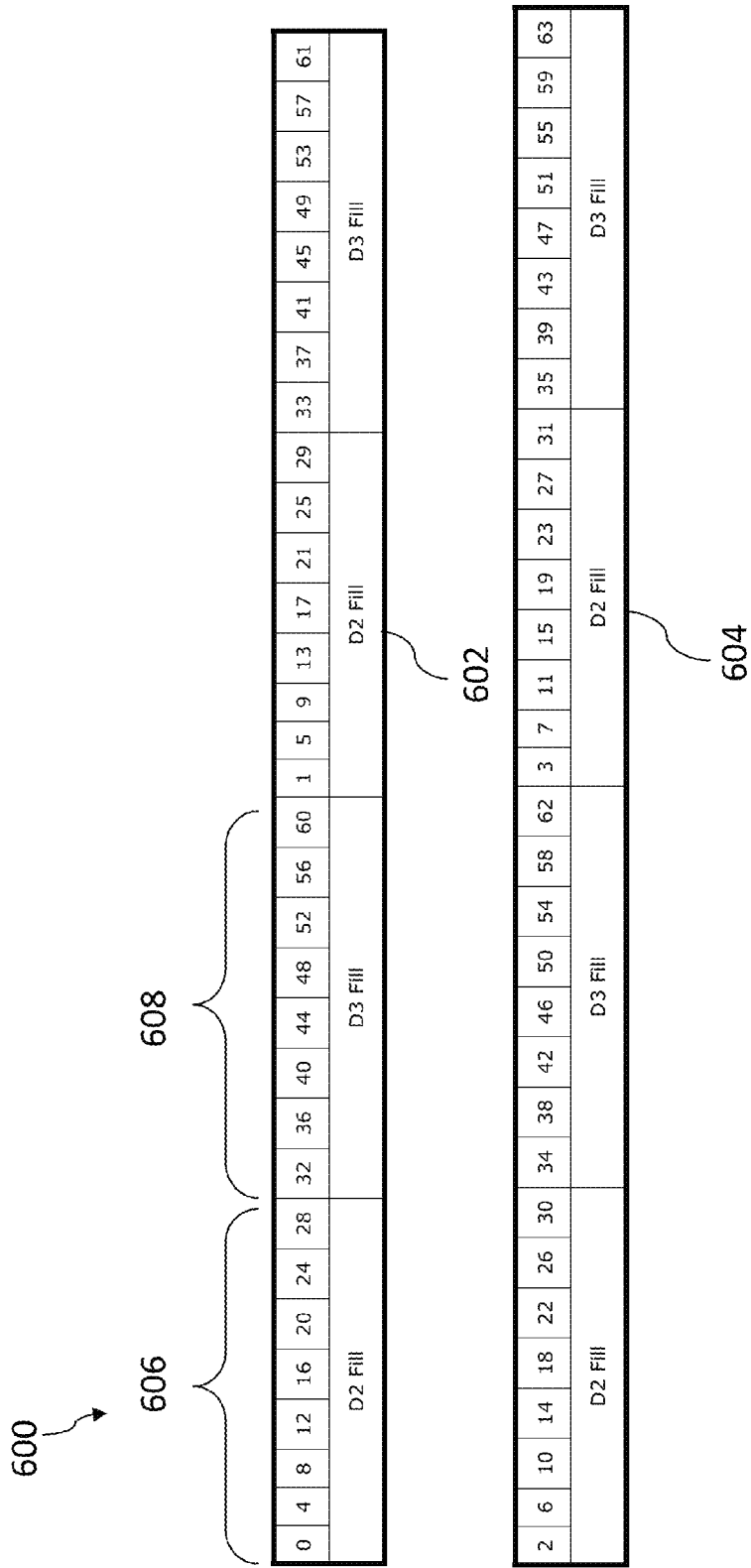

Four-point values 510, 512 output by the butterfly unit 308 are stored in output butterfly registers D2, D3. The values stored in output registers D2, D3 may appear in the same order as in the input register B0, but they may be read out in a different, transposed order 514, 516. In other words, in this first stage, data points are read in a first order corresponding to the template 0, 1, 2, 3, 4, 5, 6, 7 and read out in an order corresponding to the template 0, 4, 8, 12, 16, 20, 24, 28. The processed points may then be re-written into memory (e.g., the local memory 304, 306 or system memory) over the original 0 . . . 63 points in accordance with this transposed order. FIG. 6 illustrates the contents 600 of the memory after the fill; the lower 32 points 602 are filled with a first set of processed points alternatingly filled from output registers D2, D3—that is, the first eight points 606 are filled with data corresponding to indexes 0, 4, 8, 12, 16, 20, 24, 28 first read from register D2, the second eight points 608 are filled with data corresponding to indexes 32, 36, 40, 44, 48, 52, 56, 60 first read from register D3, and so on.

Figure 10:
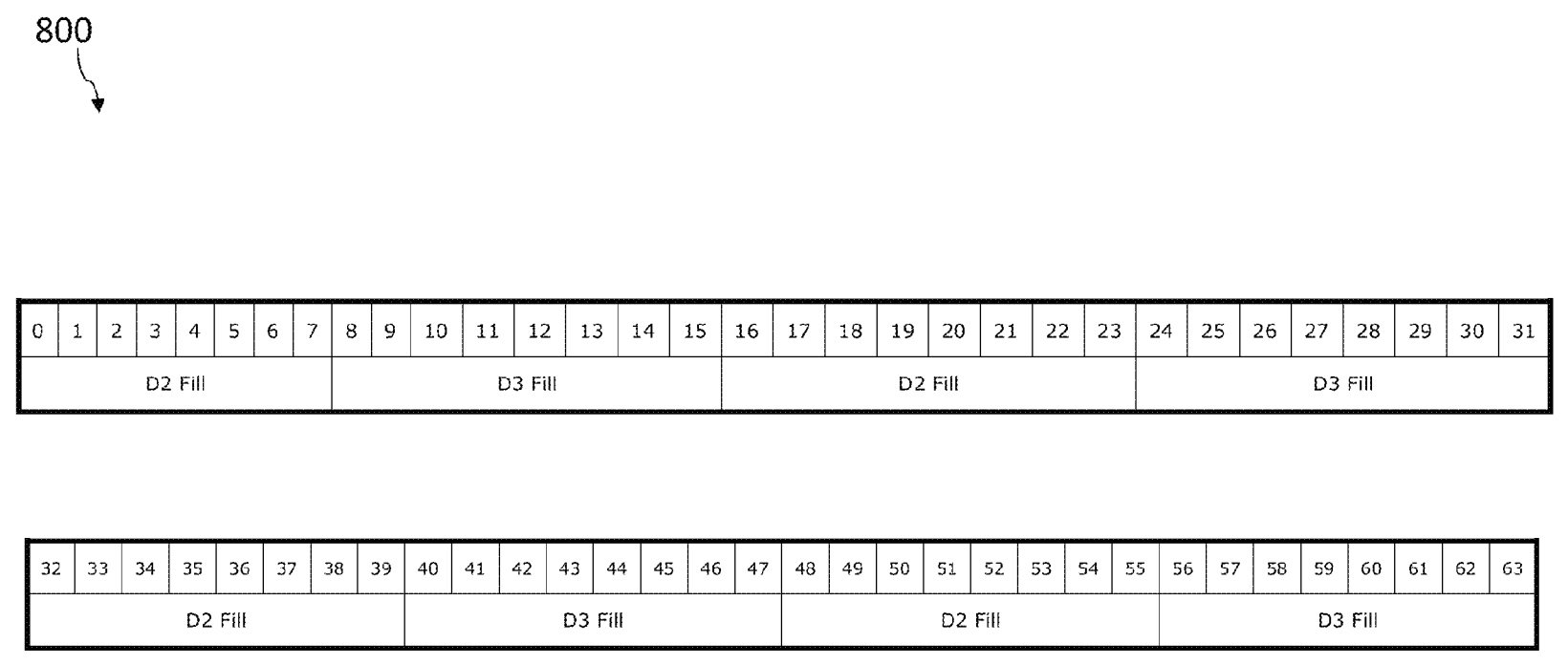
Figure 11:
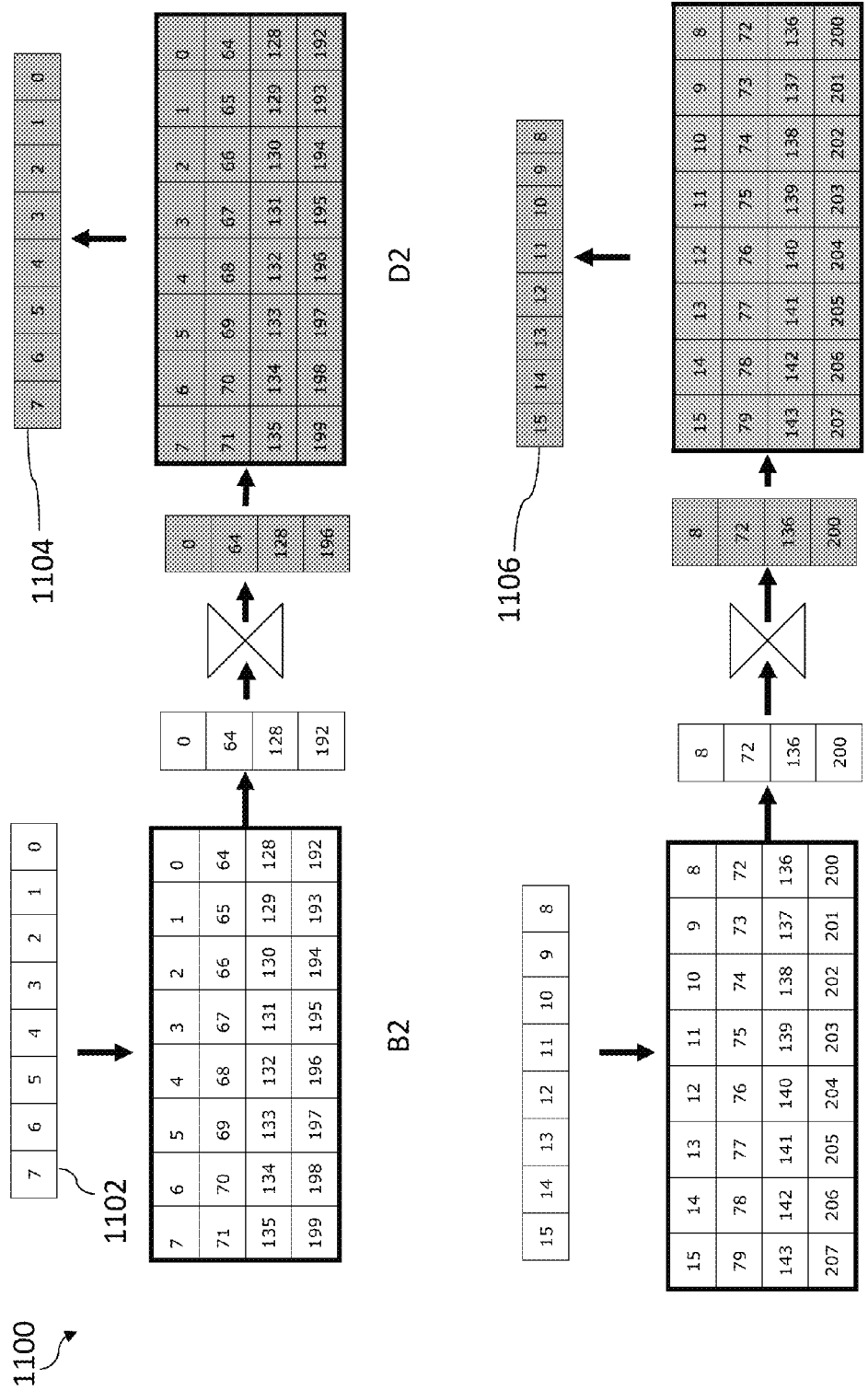
FIG. 11 illustrates fourth and subsequent stages of an FFT operation in accordance with the embodiment of the invention shown in FIG. 4A.

FIGS. 5 and 6 illustrate the first stage constant-geometry FFT performed on the input data having indexes 0 . . . 63 (as do FIGS. 7-10, as described in greater detail below) and FIG. 11 illustrates an in-place FFT performed on the data. In accordance with FIG. 4B, however, and as one of skill in the art will understand, the in-place FFT may be performed first (i.e., for the operations corresponding to FIG. 11) and the constant-geometry FFT(s) may be performed after (i.e., in accordance with the operation(s) corresponding to FIGS. 4A/4B and 5-10).

Figure 7:
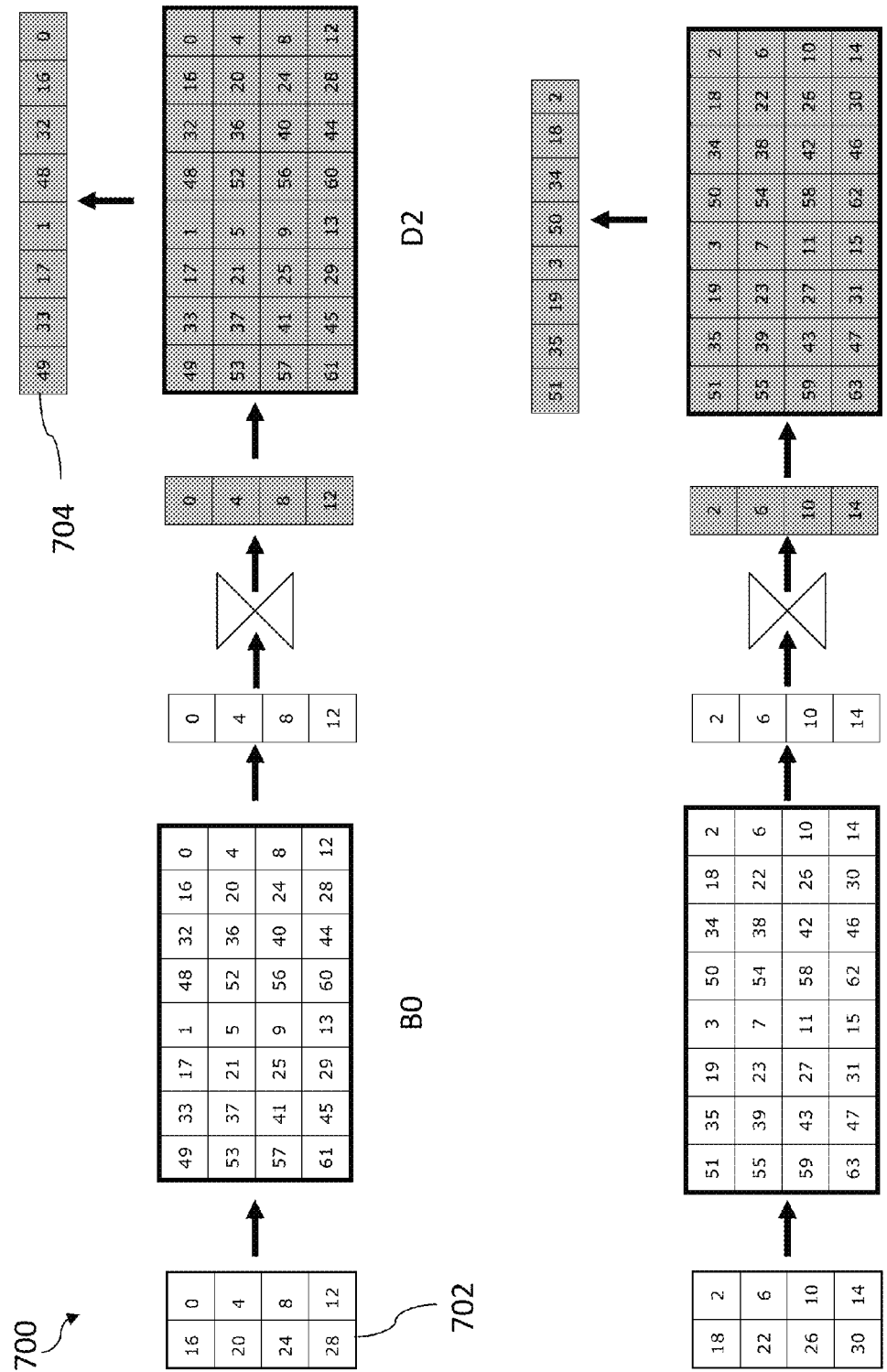
FIGS. 7 and 8 illustrate a second stage of an FFT operation and the contents of a memory thereafter in accordance with the embodiment of the invention shown in FIG. 4A.
Figure 8:
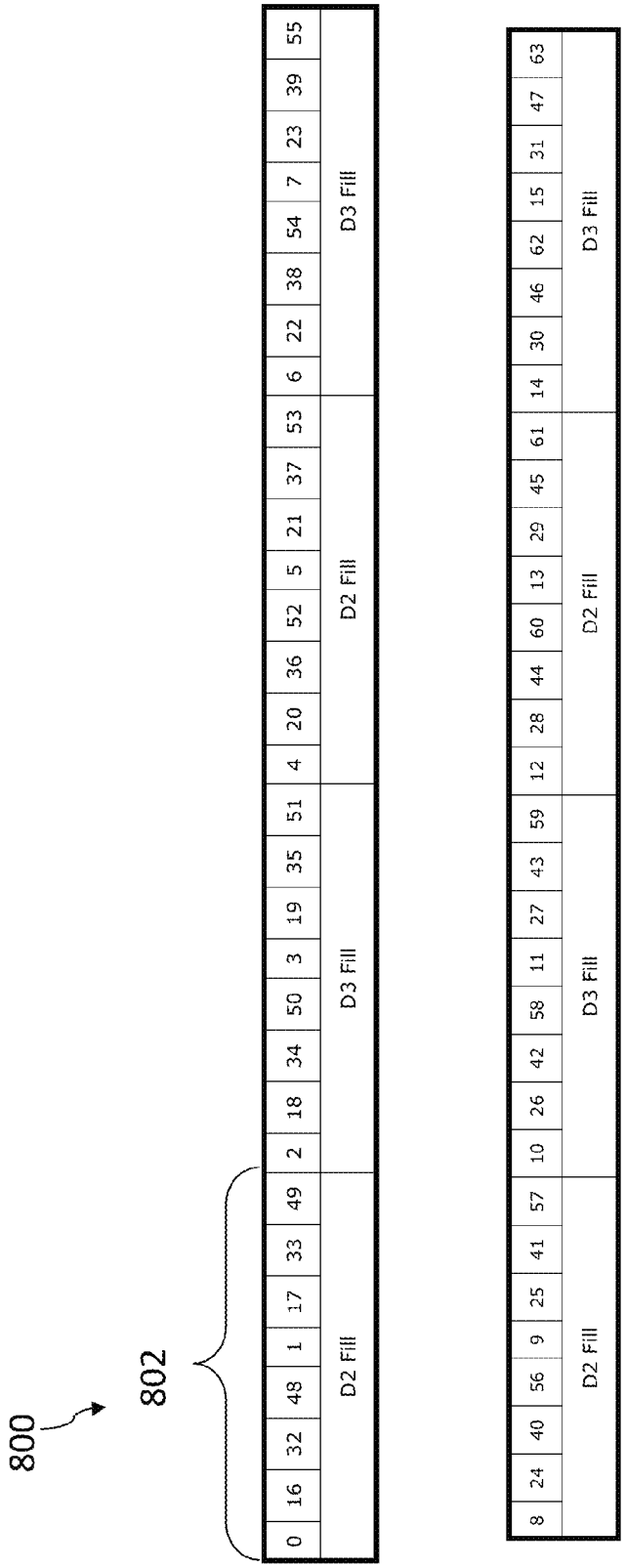
Figure 9:
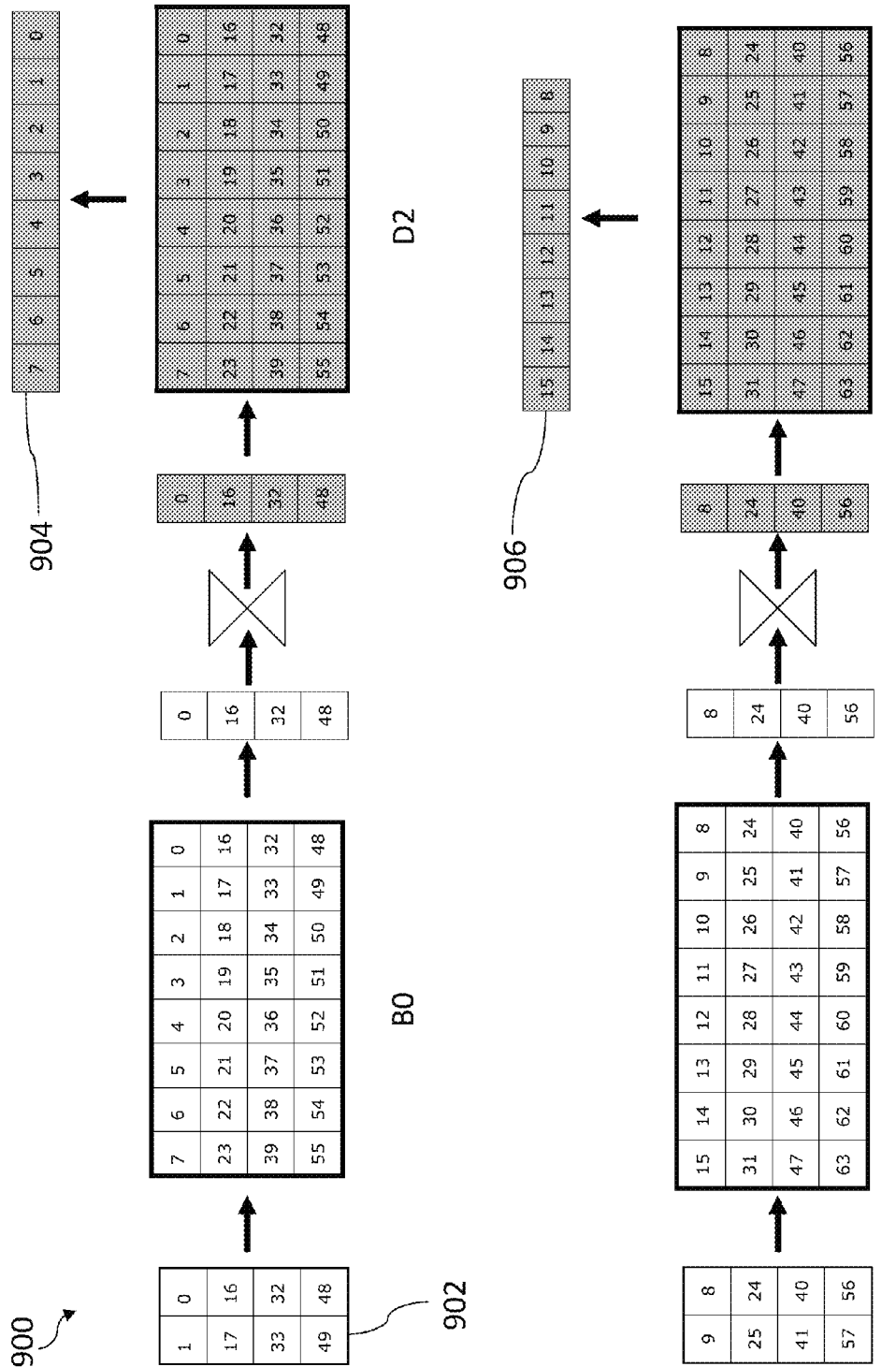

The 2nd stage constant-geometry FFT operation 700 is illustrated in FIG. 7. This second operation 700 fills the input register B0 in the same manner (i.e., using the same index locations in the same order) as the first operation 500, but because the memory 304, 306 has been re-written with a different order of points, the register B0 is filled with points having different indexes. For example, whereas the first operation 500 filled register B0 with a first group 502 of points 0, 1, 2, 3, 4, 5, 6, 7, the second operation fills register B0 with a first group 702 of points 0, 4, 8, 12, 16, 20, 24, 28 in accordance with the first eight points 606 in the memory. Register B2 is similarly filled, butterfly operations are again performed on the data, and registers D2, D3 are again filled with the results. As the data is read out of the registers D2, D3, the points are again transposed in accordance with the template 0, 16, 32, 48, 1, 17, 33, 49 as shown in the group 704. The contents of the output registers D2, D3 are again used to overwrite the data present in the memory, as shown in FIG. 8. The group 704, for example, fills the first eight points 802 in the memory.

The 3rd stage constant-geometry FFT operation 900 is run, using the values computed in the second operation 700, and registers B0, B1 are again filled with the contents of the memory. A first group 902 of values written to the register B0, for example, corresponds to the first eight points 802 of the memory. Reading the processed data out of registers D2, D2 includes another transpose operation; after these three transpose operations, the data read out of the registers D2, D3 again appears in its natural, original order. For example, the first values 904 read out of register D2 have indexes 0, 1, 2, 3, 4, 5, 6, 7 and the first values 906 read out of register D3 have indexes 8, 9, 10, 11, 12, 13, 14, 15. FIG. 10 illustrates how the memory 1000 is now filled with data having indexes 0 . . . 63, as it was originally read in.

Each 64-bit group of the original set of input data is similarly run through three constant-geometry FFT operations (either serially through the same butterfly unit 308 or in parallel using additional FFT accelerator units). Once three constant-geometry FFT operations are performed on each 64-point group, the groups may be combined by performing one or more in-place FFT butterfly operations on all the groups. For example, in case of radix-4, a 256-point FFT may require a fourth stage, a 1024-point FFT may require a fifth stage, and so on. For these subsequent in-place stages, registers B2 and B3 may be used in lieu of registers B0 and B1, as shown in a sample fourth operation 1100 in FIG. 11. The registers B2, B3 read data in a certain order 1102 such that the data 1104, 1106 read out of the registers D2, D3 remains untransposed.

As one of skill in the art will understand, a constant-geometry FFT operation may require additional memory space to hold some or all of the input data points (in exchange for the benefit of simpler routing and control logic) during the operation. In one embodiment, this additional memory space is provided by the buffers B0-B3 and D2-D3; data points are read out and stored "in-flight" in one or more of the registers B0-B3 and D2-D3 prior to being re-written with updated values following completion of a butterfly stage. Alternatively or in addition, additional memory space in the memories 304, 306 may be used. For example, 64 extra points may be used as temporary storage for a –512-point FFT operation.

One embodiment of a timing diagram 1200 implementing the in-flight storage is shown in FIG. 12. The timing diagram 1200 maps a four-stage 512-point FFT operation, in which registers B0, B1 are used in stages one, two, and three and registers B2, B3 are used in stage four. The numbers in the diagram 1200 reflect the cycles in which each operation occurs; in the first stage, for example, register B0 is filled in cycles 0, 2, 4, 6 (represented as "0→6:2," as in "cycles 0 through 6 in steps of 2"). Once all the data has arrived in cycle 6, a butterfly operation is performed in cycles 7→17, and register D2 is filled with the results in cycles 11→18 (allowing for the latency in the butterfly unit 308). The results are written back into main memory in cycles 19→25:2; these results overwrite the original data, but only after it has been used and is no longer needed. Other data points are loaded in other registers B1, B2, B3 in other stages and processed in accordance with the timing diagram 1200; the rest of the data points are similarly written back to the same storage space in memories 304, 306.

In one embodiment, the memories 304, 306 are single-ported (i.e., they have a single, shared mechanism to both read and write the storage cells contained within). As one of skill in the art will understand, single-ported memories may be smaller, simpler, more reliable, and/or less power-hungry than multi-ported memories. The timing diagram 1200 reflects a pattern of reads and writes to the memories 304, 306 that allow a single-ported implementation thereof. The memories 304, 306 are read to fill the registers B0-B3 and written from the registers D2, D3; these reads and writes are timed to occur in different cycles. In one embodiment, as shown in the diagram 1200, the reads occur in even-numbered cycles and the writes occur in odd-numbered cycles. For example, the memories 304, 306 are written from register D3 at the end of stage one in cycles 43, 45, 47, 49 while, in stage two, register B1 is filled in cycles 40, 42, 44, 46 and register B0 is filled in cycles 48, 50, 52, 54. One of skill in the art will understand that different read/write patterns, and/or different cycles, are within the scope of the current invention.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for computationally performing a Fast Fourier Transform ("FFT") on n points, the method comprising:
   dividing the n points into a plurality of groups of m points, where m<n;
   performing a plurality of constant-geometry FFTs on each of the groups of m points, each constant-geometry FFT comprising:
      i. reading the m points from a computer memory into an input buffer;
      ii. computationally applying a butterfly operation to each of the m points;
      iii. writing results of the butterfly operation into an output buffer; and
      iv. storing transposed contents of the output buffer to the original location of the m points in the computer memory, thereby overwriting the original m points; and
   performing at least one in-place FFT on the results of the plurality of constant-geometry FFTs stored in the computer memory, thereby completing the FFT of the n points.

2. The method of claim 1, wherein n is $2^x$, wherein x is an integer.

3. The method of claim 2, wherein m is 64.

4. The method of claim 1, wherein the butterfly operation is radix-2 or radix-4.

5. The method of claim 1, wherein the computer memory is single-ported, and wherein only one read or write thereto occurs in a cycle.

6. The method of claim 1, wherein performing the in-place FFT comprises writing the m points to a different kind of input buffer.

7. The method of claim 6, wherein writing the m points to the different kind of input buffer cancels out the transposition of contents by the output buffer.

8. The method of claim 1, wherein n is not a multiple of m, further comprising adding points to the n points until the total number of points is a multiple of m.

9. A system for performing a Fast Fourier Transform ("FFT") on n points, the system comprising:
   an input buffer for receiving a subset of the n points, the subset comprising m points;
   a butterfly unit for performing a butterfly operation on the m points;
   an output buffer for receiving a result of the butterfly operation, the output buffer comprising an output port for transposing data points stored therein; and
   control logic for directing the butterfly unit to perform a plurality of constant-geometry butterfly operations followed by at least one in-place butterfly operation.

10. The system of claim 9, further comprising a local memory for storing the n points.

11. The system of claim 10, wherein the local memory is a single-ported memory.

12. The system of claim 10, wherein the local memory comprises two banks.

13. The system of claim 9, further comprising an input FIFO for receiving the n points from an external memory.

14. The system of claim 9, further comprising an output FIFO for sending the n points to an external memory.

15. The system of claim 9, wherein the input buffer comprises a first type of input buffer for constant-geometry butterflies and a second type of input buffer for in-place butterflies.

16. A method for computationally performing a Fast Fourier Transform ("FFT") on n points, the method comprising:
   performing at least one stage of in-place FFTs on all n points;
   dividing the n points of the in-place FFT result into a plurality of groups of m points, where m<n; and
   performing a constant-geometry FFT on each of the groups of m points, the constant-geometry FFT comprising:
      i. reading the m points from a computer memory into an input buffer;
      ii. computationally applying a butterfly operation to the transposed contents of the input buffer which holds each of the m points;
      iii. writing results of the butterfly operation into an output buffer; and
      iv. storing contents of the output buffer to the original location of the m points in the computer memory, thereby overwriting the original m points, thereby completing the FFT of the n points.

17. The method of claim 16, wherein n is $2^x$, wherein x is an integer.

18. The method of claim 17, wherein m is 64.

19. The method of claim 16, wherein the butterfly operation is radix-2 or radix-4.

20. The method of claim 16, wherein the computer memory is single-ported, and wherein only one read or write thereto occurs in a cycle.

21. A system for computationally performing a Fast Fourier Transform ("FFT") on n points, the system comprising:
   means for dividing the n points into a plurality of groups of m points, where m <n;
   means performing a plurality of constant-geometry FFTs on each of the groups of m points, each constant-geometry FFT comprising:
      i. reading the m points from a computer memory into an input buffer;
      ii. computationally applying a butterfly operation to each of the m points;
      iii. writing results of the butterfly operation into an output buffer; and
      iv. storing transposed contents of the output buffer to the original location of the m points in the computer memory, thereby overwriting the original m points; and
   means for performing at least one in-place FFT on the results of the plurality of constant-geometry FFTs stored in the computer memory, thereby completing the FFT of the n points.

22. A non-transitory computer-readable storage medium storing one or more computer-readable programs which, when executed on a processor, configure the processor to carry out a method for computationally performing a Fast Fourier Transform ("FFT") on n points, the method comprising:
   dividing the n points into a plurality of groups of m points, where m <n;
   performing a plurality of constant-geometry FFTs on each of the groups of m points, each constant-geometry FFT comprising:
      i. reading the m points from a computer memory into an input buffer;
      ii. computationally applying a butterfly operation to each of the m points;
      iii. writing results of the butterfly operation into an output buffer; and
      iv. storing transposed contents of the output buffer to the original location of the m points in the computer memory, thereby overwriting the original m points; and performing at least one in-place FFT on the results of the plurality of constant-geometry FFTs stored in the computer memory, thereby completing the FFT of the n points.

23. A system for computationally performing a Fast Fourier Transform ("FFT") on n points, the system comprising:
means for performing at least one stage of in-place FFTs on all n points;
means for dividing the n points of the in-place FFT result into a plurality of groups of m points, where m <n; and
means for performing a constant-geometry FFT on each of the groups of m points, the constant-geometry FFT comprising:
i. reading the m points from a computer memory into an input buffer;
ii. computationally applying a butterfly operation to the transposed contents of the input buffer which holds each of the m points;
iii. writing results of the butterfly operation into an output buffer; and
iv. storing contents of the output buffer to the original location of the m points in the computer memory, thereby overwriting the original m points, thereby completing the FFT of the n points.

24. A non-transitory computer-readable storage medium storing one or more computer-readable programs which, when executed on a processor, configure the processor to carry out a method for computationally performing a Fast Fourier Transform ("FFT") on n points, the method comprising:
performing at least one stage of in-place FFTs on all n points;
dividing the n points of the in-place FFT result into a plurality of groups of m points, where m <n; and
performing a constant-geometry FFT on each of the groups of m points, the constant-geometry FFT comprising:
i. reading the m points from a computer memory into an input buffer;
ii. computationally applying a butterfly operation to the transposed contents of the input buffer which holds each of the m points;
iii. writing results of the butterfly operation into an output buffer; and
iv. storing contents of the output buffer to the original location of the m points in the computer memory, thereby overwriting the original m points, thereby completing the FFT of the n points.

* * * * *